United States Patent Office 3,246,012
Patented Apr. 12, 1966

3,246,012
L-THREO-1,3-DIOXOLANE
Peter Werner Feit, Gentofte, Denmark, assignor to Løvens Kemiske Fabrik ved A. Kongsted, Ballerup, Denmark, a firm
No Drawing. Filed Mar. 25, 1964, Ser. No. 354,778
Claims priority, application Great Britain, Sept. 15, 1961, 33,247/61; Oct. 2, 1961, 35,532/61
10 Claims. (Cl. 260—340.9)

This invention relates to hitherto unknown L-threo-1,3-dioxolanes.

The present application contains subject matter directed to the L-threo-1,3-dioxolanes divided from and is a continuation-in-part of my copending application Serial No. 222,950, filed September 11, 1962, for Production of L-Threitol-1,4-Di-(Methane-Sulphonate), now abandoned, which is incorporated herein by reference. A continuation-in-part of Serial No. 222,950 was filed as application Serial No. 223,837, filed September 14, 1962, for Production of L-Threitol-1,4-Di-(Methane-Sulphonate) and the latter application now abandoned embodies similar subject matter, and the present application likewise includes claims directed to the composition divided therefrom. This latter application is also incorporated herein by reference. The present application is also a continuation-in-part of this latter application 223,837, which like 222,950 was copending before abandonment.

The prefix, L-threo, refers to the fact that the carbon atoms in the 4- and 5-positions in the dioxolane ring have the same stereo-isomeric configuration as the carbon atoms in the 2- and 3-positions in L-threitol.

Particularly the invention concerns L-threo-1,3-dioxolanes which may be represented by the general formula:

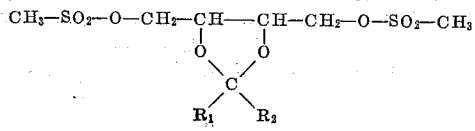

in which $R_1$ and $R_2$ are individually selected from the class consisting of hydrogen; lower saturated alkyl groups containing from one to six carbon atoms such as methyl, ethyl, propyl, isopropyl, butyl, isobutyl, pentyl, or hexyl; lower saturated alkyl groups containing from one to three carbon atoms substituted with halogen, aryl groups or cycloalkyl groups such as $-CH_2Cl$, $-CH_2Br$, $-CH_2F$, $-CHCl_2$, $-CHBr_2$, $-CCl_3$, $-CF_3$, $-CH_2CH_2Cl$, $-CHCl \cdot CH_3$, $-CH_2 \cdot CHClCH_3$, $-CH_2C_6H_5$ $-CH_2CH_2C_6H_5$, $-CH_2CH_2CH_2C_5H_{10}$; cycloalkyl groups containing from five to seven carbon atoms in the ring system, such as cyclopentane, cyclohexane or cycloheptane; mononuclear carbocyclic aryl groups such as phenyl; mononuclear carbocyclic aryl-lower alkyl groups where the lower alkyl group is saturated and has a carbon chain length of one to six carbon atoms such as $-C_6H_4 \cdot CH_3$, $-C_6H_3(CH_3)_2$ including the o-, m-, and p-xylyl group, $-C_6H_4 \cdot C_2H_5$, $-C_6H_4 \cdot C_3H_7$, $-C_6H_4 \cdot C_4H_9$; and

can furthermore be a cycloaliphatic ring containing from three to seven carbon atoms in the ring.

L-threitol-1,4-di(methane-sulphonate) is active against certain forms of leukaemia and has been disclosed in my U.S. patent application Serial No. 90,657, filed February 21, 1961, now U.S. Patent 3,155,702, and in my U.S. patent application Serial No. 89,103, filed February 14, 1961, now abandoned.

The compounds of the invention are useable as starting materials in a method of producing L-threitol-1,4-di-(methane-sulphonate), more specifically, it has been found that the latter compound can be produced in a far more advantageous way according to which the methane-sulphonate groups in advance are introduced in dioxolanes related to L-threitol, viz. cyclic 2,3-O-acetals and cyclic 2,3-O-ketals, in which the hydroxy groups of the L-threitol in the 2- and 3-positions are temporarily protected making a selective methane-sulphonation of its terminal hydroxy groups possible whereupon the resulting product by a simple solvolysis is converted into the desired L-threitol-1,4-di(methane-sulphonate).

The specific way of preparing L-threitol-1,4-di(methane-sulphonate) aforesaid is advantageous because it results in high yields of this compound calculated on the basis of the raw materials used, which may furthermore be inexpensive.

The L-threo-1,3-dioxolane derivatives of the invention are easily producible by the corresponding cyclic 2,3-O-acetal or 2,3-O-ketal of L-threitol being reacted with a reactive functional derivative of methane-sulphonic acid, such as the methane-sulphonic acid anhydride or a methane-sulphonyl halogenide, and the 1,4-disulphonate thus produced subsequently being recovered. Preferably, the reaction is carried out in the presence of an acid-binding substance, for which purpose a tertiary amine such as pyridine has proved very suitable.

The reaction is commonly carried out in the presence of a solvent, which advantageously can be an excess of the tertiary amine employed.

The starting substances used in the method aforesaid are with a few exceptions also hitherto unknown compounds. Among the exceptions mention may be made of 2,3-O-isopropylidene-L-threitol, the preparation of which has been described by Rubin et al. (J.A.C.S., 74, page 425), by a method unsuitable for the purpose of obtaining the compounds on a commercial scale.

However, it has been found that the said 2,3-O-acetals and 2,3-O-ketals of L-threitol in general can be obtained by adequate methods with a view to their being used as raw materials.

Thus, for instance 2,3-O-isopropylene-L-threitol is easily obtained by way of the appropriate method according to which a suitable di-ester of L-tartaric acid is reacted with the aldehyde or ketone in question, whereby the corresponding cyclic 2,3-O-acetal or 2,3-O-ketal of the said di-ester is formed, which compound by a reduction is easily converted into the desired cyclic 2,3-O-acetal or 2,3-O-ketal of L-threitol, and according to experience preferably by the di-ester being reduced with LiAlH$_4$.

The steps of the latter appropriate way of obtaining the said 2,3-O-acetals and 2,3-O-ketals are illustrated in the examples of preparation given below:

PREPARATION OF 2,3-O-ISOPROPYLIDENE-DIETHYL-L-TARTRATE

A mixture of 66 g. diethyl-L-tartrate, 200 ml. of acetone and 400 ml. of petrol ether (boiling point: 40–60° C.) was boiled under reflux for 96 hours after addition of 3 drops of conc. sulphuric acid. The water formed by the reaction was removed from the distillate through a water-separator. The reaction mixture was then evaporated in vacuo, and the residue thus obtained was dissolved in ether. The ethereal solution was washed with a saturated aqueous solution of borax, and subsequently with water. After the ethereal phase had been dried over magnesium sulphate, the ether was distilled off and the residue distilled in vacuo. At 11 mm. Hg the 2,3-O-isopropylidene-diethyl-L-tartrate distilled at 137.0–139.5° C. The pure product had $[\alpha]_D^{20} = -51.19°$ (c.=2, acetone).

PREPARATION OF 2,3-O-PHENYLETHYLIDENE-DIETHYL-L-TARTRATE 33 g. of diethyl-L-tartrate, 150 ml. of benzene and 25 g. of phenylacetaldehyde were mixed, and 3 drops of conc. sulphuric acid were added. The reaction mixture was boiled under reflux, and the water formed by the reaction was removed from the distillate through a water-separator. After 20 hours of boiling the reaction mixture was diluted with 300 ml. of ether, and the ethereal solution was washed with a saturated aqueous solution of borax, and subsequently with water. After the ethereal phase had been dried over sodium sulphate the ether was distilled off and the residue obtained was distilled in vacuo. At 0.5 mm. Hg the 2,3-O-phenylethylidene-diethyl-L-tartrate distilled at 158–162° C.

PREPARATION OF 2,3 - O - ISOPROPYLIDENE-L-THREITOL BY 2,3 - O - ISOPROPYLIDENE - DIETHYL-L-TARTRATE BEING REDUCED WITH LiAlH₄

17 g. of LiAlH₄ was poured into 500 ml. of ether, and the mixture was boiled under reflux for one hour. A solution of 45 g. of 2,3-O-isopropylidene-diethyl-L-tartrate in 250 ml. of ether was then added by drops, and the boiling under reflux was continued for a further 6 hours. Then 17 ml. of water followed by 17 ml. of N/4 sodium hydroxide and 51 ml. of water were added by drops while under effective cooling. This caused a precipitation of the aluminum oxides in an easily filterable form. The reaction mixture was filtered, and the filter cake continuously extracted with ether for some hours. The combined ethereal phases were dried over MgSO₄ and evaporated in vacuo, finally in an oil bath at 100° C. The residue consisted of 2,3-O-isopropylidene-L-threitol. In a similar way, 2,3-O-phenylethylidene-L-threitol (boiling point: 158–162° C. at 0.5 mm. Hg) and 2,3-O-methylene-L-threitol were produced by the above-mentioned 2,3-O-phenylethylidene-diethyl-L-tartrate and the known 2,3-O-methylene-diethyl-L-tartrate, respectively, being reduced with LiAlH₄.

It will be understood that it is highly advantageous that by way of the reactions described above the L-threo-1,3-dioxolanes used as starting substances in the method for producing the compounds of the invention are obtainable in high-percentage yields from the corresponding L-tartaric acid, which commercially is furthermore an easily available and rather inexpensive basic raw material.

The invention will now be illustrated by the following example.

Example 1

PREPARATION OF 2,3-O-METHYLENE-L-THREITOL-1,4-DI-(METHANE-SULFONATE)

10 g. of 2,3-O-methylene-L-threitol was dissolved in 50 ml. of dry pyridine. At a temperature of −20° C. 28 g. of methane-sulphochloride was added by drops under stirring, whereupon the temperature rose gradually to 0° C. After standing for 16 hours at 0° C. the reaction mixture was poured into ice-water, whereby 2,3-O-methylene-L-threitol-1,4-di-(methane-sulphonate) separated and was isolated by filtration. By recrystallization of the dry product from chloroform, the substance was obtained with a melting point of 94.5° C. and $[\alpha]_D^{20} = -18.97°$ (c.=2, acetone) was obtained.

Following the procedure described above, but substituting a corresponding cyclic 2,3-O-ketal or acetal of L-threitol for 2,3-O-methylene-L-threitol, the following compounds were prepared; 2,3-O-benzylidene-L-threitol-1,4-di-(methane-suphonate) with a melting point of 116.0–117.5° C. and $[\alpha]_D^{20} = -15.0°$ (acetone); 2,3-O-chlorobenzylidene-L-threitol - 1,4 - di-(methane-sulphonate); 2,3-O-furfurylidene-L-threitol-1,4-di-(methane-sulphonate); 2,3-O-trichloroethylene-L-threitol-1,4-di-(methane-sulphonate) with a melting point of 105.5–106.5° C. and $[\alpha]_D^{20} = -21.84°$ (acetone); 2,3-O-tribromoethylidene-L-threitol-1,4-di-(methane-sulphonate) with a melting point of 110.5–112.5° C. and $[\alpha]_D^{20} = -13.96°$ (acetone); 2,3-O-ethylidene-L-threitol-1,4-di-methane-sulphonate) with a melting point of 108.5–110.5° C. and $$[\alpha]_D^{20} = -37.6°$$

(acetone); 2,3-O-cyclohexylidene - L - threitol - 1,4-di-(methane-sulphonate) with a melting point of 95.5–97.0° C. and $[\alpha]_D^{20} = -20.4°$ (acetone); 2,3-O-isopropylidene-L-threitol-1,4-di-(methane-sulphonate), with a melting point of 85.5–86.5° C. and $[\alpha]_D^{20} = -21.9°$ (acetone); and 2,3-O-phenylethylidene - L - threitol-1,4-di-(methane-sulphonate), with a melting point of 80.0–81.5° C. and $[\alpha]_D^{20} = -19.0°$ (acetone).

What I claim and desire to secure by Letters Patent having thus described my invention, is:

1. As an intermediate in the production of L-threitol-1,4-di-(methane-sulphonate), an L-threo-1,3-dioxolane of the formula:

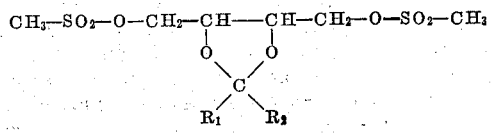

in which R₁ and R₂ are selected from the class consisting of hydrogen, lower alkyl containing from one to six carbon atoms, lower halogen-substituted alkyl containing from one to two carbon atoms in the alkyl chain, lower monophenyl-substituted alkyl containing from one to two carbon atoms in the alkyl chain, phenyl and cyclohexyl, formed from

at least one of R₁ and R₂ being hydrogen other than where R₁ and R₂ are both methyl.

2. 2,3 - O - methylene - L - threitol - 1,4 - di - (methane-sulphonate).

3. 2,3-O-isopropylidene - L - threitol - 1,4-di-(methane-sulphonate).

4. 2,3-O-phenylethylidene - L - threitol-1,4-di-(methane-sulphonate).

5. 2,3 - O - benzylidene - L - threitol - 1,4 - di-(methane-sulphonate).

6. 2,3-O-furfurylidene - L - threitol - 1,4 - di-(methane-sulphonate).

7. 2,3-O-trichloro - ethylidene - L - threitol-1,4-di-methane-sulphonate).

8. 2,3-O-tribromoethylidene - L - threitol - 1,4-di-(methane-sulphonate).

9. 2,3 - O - ethylidene - L - threitol - 1,4 - di - (methane-sulphonate).

10. 2,3-O-cyclohexylidene - L-threitol-1,4-di-(methane-sulphonate).

No references cited.

WALTER A. MODANCE, *Primary Examiner.*